(12) United States Patent
Braunbeck et al.

(10) Patent No.: US 7,494,167 B2
(45) Date of Patent: Feb. 24, 2009

(54) MOTOR VEHICLE CHASSIS FOR A MOTOR VEHICLE

(75) Inventors: Bardo Braunbeck, Oppenheim (DE); Theobald Hock, Grossostheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/757,077

(22) Filed: Jun. 1, 2007

(65) Prior Publication Data

US 2007/0278824 A1    Dec. 6, 2007

(30) Foreign Application Priority Data

Jun. 2, 2006    (DE)    .................. 10 2006 025 856

(51) Int. Cl.
   *B60R 19/34*    (2006.01)
(52) U.S. Cl. ...................... 293/133; 293/155
(58) Field of Classification Search ............. 293/132, 293/133, 155; 296/187.03, 187.9, 187.11
   See application file for complete search history.

(56) References Cited

U.S. PATENT DOCUMENTS 6,227,583 B1 *    5/2001    Eipper et al. ................ 293/133
7,188,877 B2 *    3/2007    Gonzalez et al. ............ 293/133
7,201,413 B2 *    4/2007    Hillekes et al. ............. 293/133
2006/0125254 A1    6/2006    Arns et al.

FOREIGN PATENT DOCUMENTS

DE    102004060088 B3 *    2/2006
DE    102005021663           5/2006

\* cited by examiner

*Primary Examiner*—Glenn Dayoan
*Assistant Examiner*—Gregory Blankenship
(74) *Attorney, Agent, or Firm*—Ingrassia Fisher & Lorenz, P.C.

(57) ABSTRACT

A motor vehicle chassis for a motor vehicle with a longitudinal support beam and with a crashbox introduced into the longitudinal supporting beam, in that state when it is separated from the longitudinal supporting beam, is narrower than two opposing walls of the longitudinal supporting beam. By virtue of this the crashbox can be simply inserted into the longitudinal supporting beam. After assembly the lateral shell parts of the crashbox are pre-tensioned against the walls of the longitudinal supporting beam. By virtue of this the crashbox) is firmly joined with the longitudinal supporting beam.

13 Claims, 6 Drawing Sheets

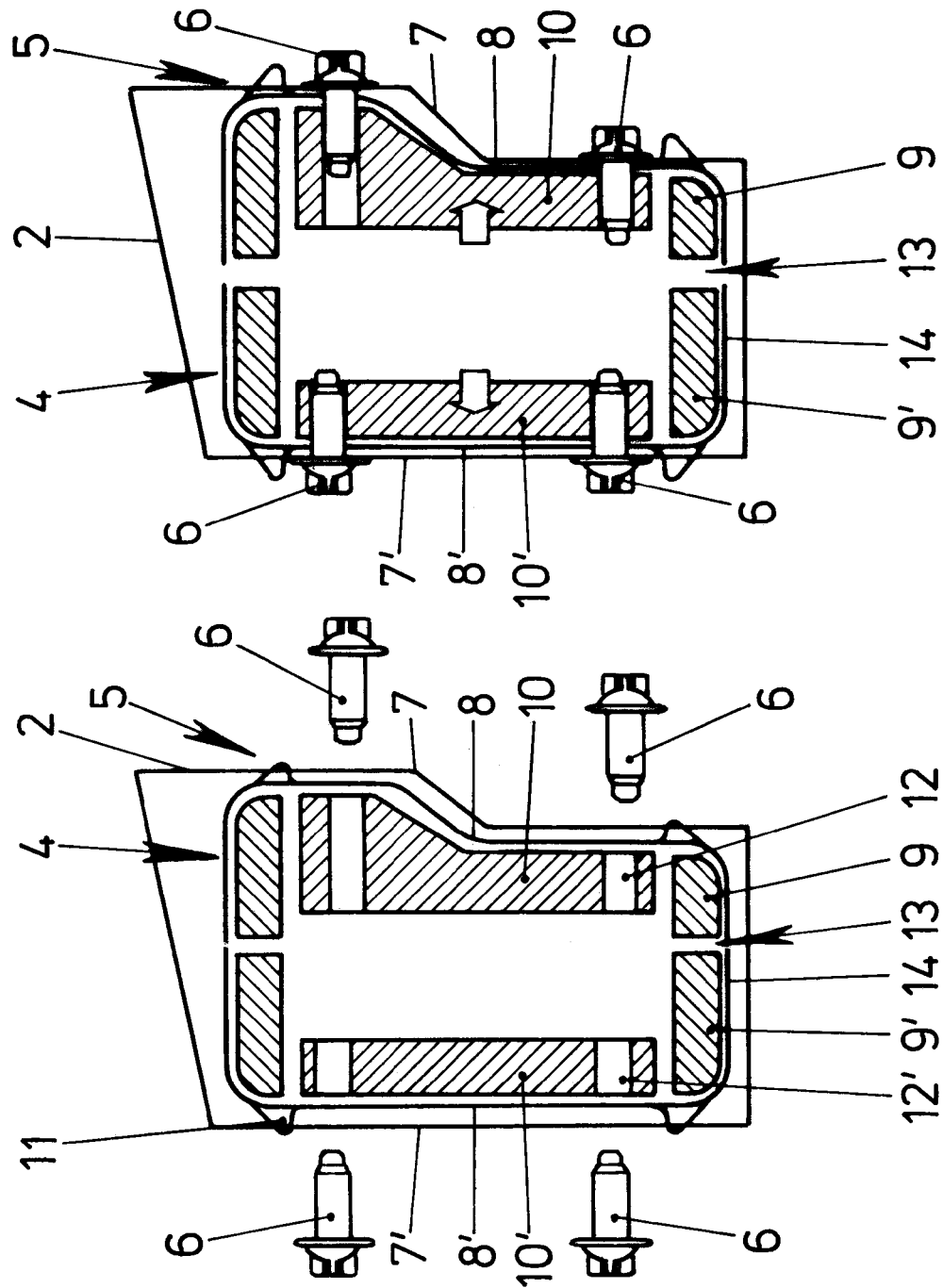

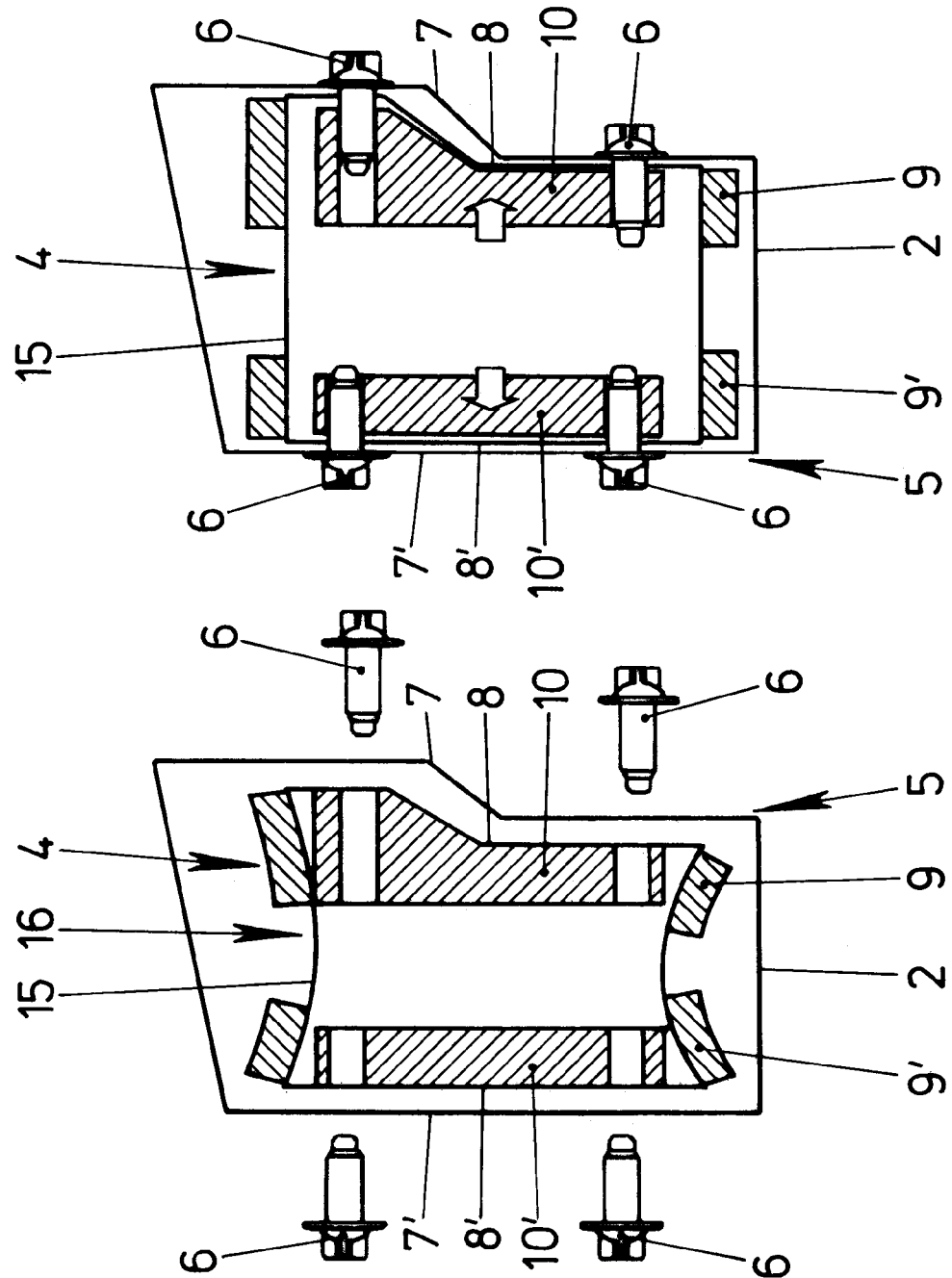

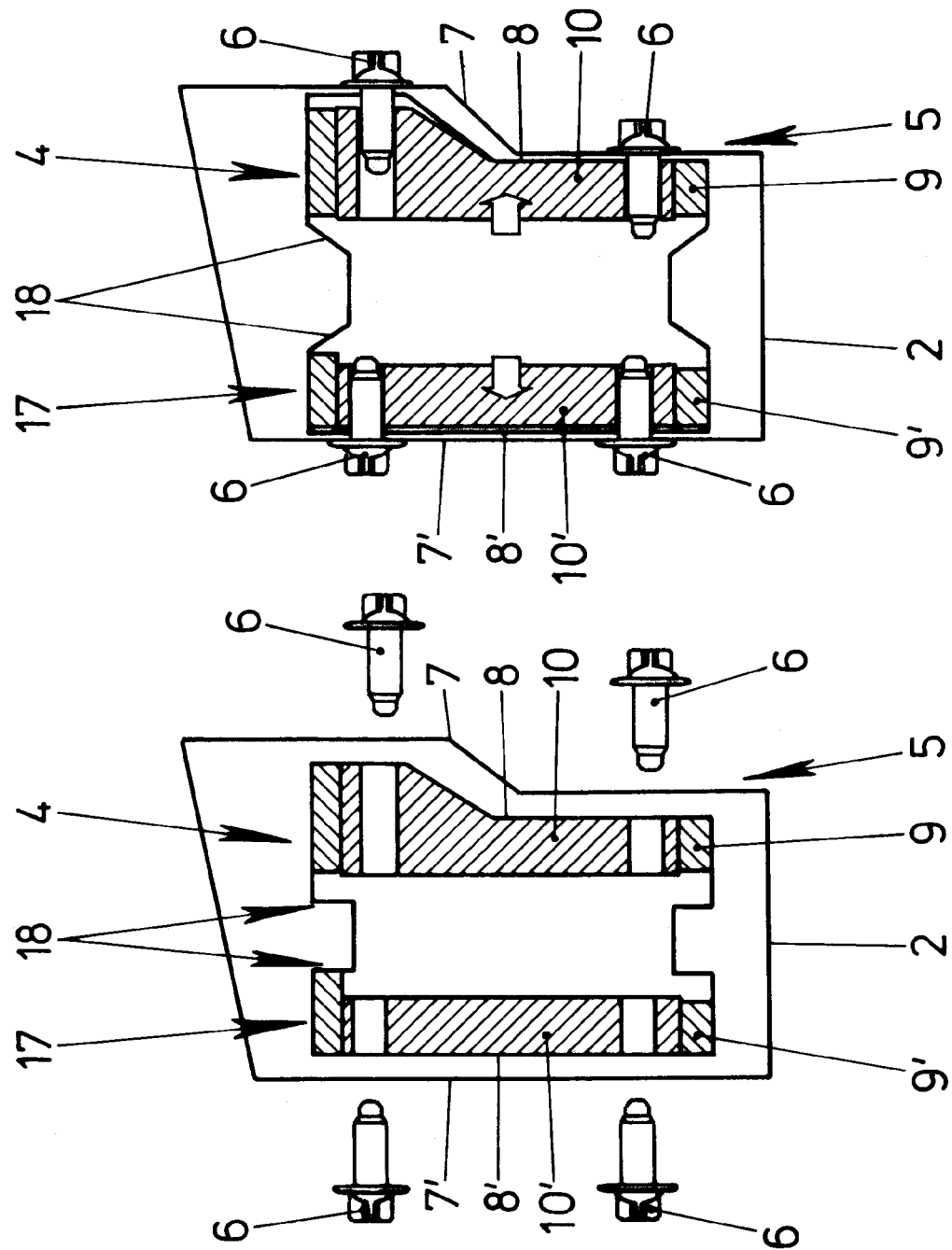

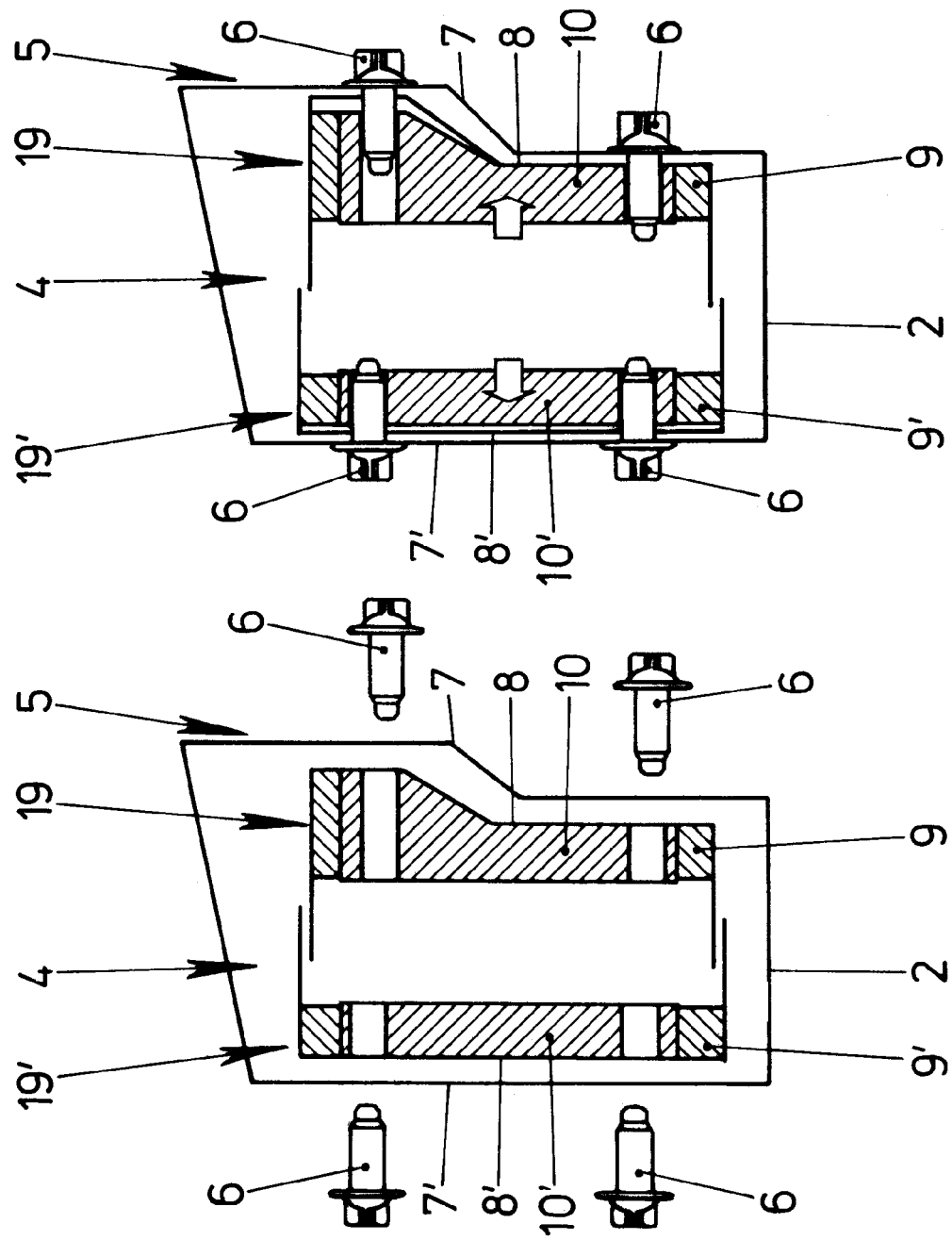

MOTOR VEHICLE CHASSIS FOR A MOTOR VEHICLE

CROSS-REFERENCE TO RELATED APPLICATION

This Utility Patent Application claims priority to German Application No. DE 10 2006 025 856.8, filed Jun. 2, 2006.

TECHNICAL FIELD

The invention concerns a motor vehicle chassis for a motor vehicle with a longitudinal support beam and with a crashbox that is inserted into one end of the longitudinal supporting beam facing the direction of the travel or opposing it and is fastened between two opposite situated walls of the longitudinal supporting beam.

BACKGROUND

Such motor vehicle chassis are often used in current motor vehicles and are known in the practice. The purpose of the crashbox is to reduce the energy of the impact in the case of a frontal or rear impact of the motor vehicle. The insertion of the crashbox into the open, facing the direction of travel, end of the longitudinal supporting beam makes an even introduction of forces into the longitudinal supporting beam possible. It is, however, a disadvantage in this case that tolerances are present between the longitudinal supporting beam and the crashbox. To compensate for the tolerances between the crashbox and the walls of the longitudinal supporting beam a gap has to be provided. To ensure, however, the intended function of the crashbox, a force-locking and/or form-locking joint with the opposite situated walls of the longitudinal supporting beam is utilized.

One could conceive to construct both opposite situated walls of the longitudinal supporting beam in a flexible manner and to deform them during the assembly of the crashbox. The longitudinal supporting beam is very rigid and is, in addition, usually provided with reinforcing sheets, so that an adequate deformation of the end of the longitudinal supporting beam, facing the direction of travel, cannot be ensured.

Furthermore, one could think of passing bolts through the end of the longitudinal supporting beam and the crashbox transversely to the axis of the longitudinal supporting beam and thus bolting the longitudinal supporting beam and crashbox with one another. The disadvantage of this, however, is that the walls of the longitudinal supporting beam have to be exactly parallel.

SUMMARY

At least one object of the invention is to further develop a motor vehicle chassis of the type mentioned in the introduction in such a manner that a simple assembly of the crashbox will be possible.

Accordingly, this objective is achieved with the crashbox, when it is separated from the longitudinal supporting beam, that is narrower than the distance between the two walls of the longitudinal supporting beam, that that end of the crashbox which protrudes into the longitudinal supporting beam can be deformed in the direction of the walls of the longitudinal supporting beam and that the crashbox is laterally pre-tensioned against the walls of the longitudinal supporting beam.

By virtue of this design, a gap can be provided between the opposite situated walls of the longitudinal supporting beam and the crashbox to compensate for the tolerances. The result of this is that for the purpose of assembly the crashbox can be simply inserted into that end of the longitudinal supporting beam which faces the direction of travel. Following this insertion, the crashbox is laterally pre-tensioned against the walls of the longitudinal supporting beam and thus is joined with the longitudinal supporting beam in a force-locking and/or form-locking manner. When the crashbox is pre-tensioned against the walls of the longitudinal supporting beam, the crashbox will be deformed. Therefore the longitudinal supporting beam can be made particularly rigid and provided with reinforcing elements. By virtue of this configuration, the motor vehicle chassis can be constructed behind the crashbox, when viewed in the direction of travel, with a predetermined rigidity. As a result, the walls of the longitudinal supporting beam do not need to be parallel.

According to an advantageous further development, the pre-tensioning of the crashbox against the walls of the longitudinal supporting beam can be particularly simply executed when the crashbox has at least two crashbox components which can move relative one another and when one of the crashbox components is fastened on one wall and the other crashbox component on the opposite situated wall of the longitudinal supporting beam.

According to another advantageous further development, the joining of the crashbox with the longitudinal supporting beam exhibits a particularly great stability when the crashbox has at least two reinforcing elements and when fastening elements join a reinforcing element each with the adjacent wall of the longitudinal supporting beam.

According to another advantageous further development, the construction of the crashbox is particularly simple when at least one crashbox component is allocated to one of the reinforcing elements.

According to another advantageous further development, the crashbox is very stable before the assembly when the crashbox components are pre-fixed with one of the reinforcing elements. In this manner, the crashbox with the reinforcing elements can be simply inserted into the longitudinal supporting beam. The pre-fixing of the components makes a secure transport possible prior to the assembly.

The motor vehicle chassis, can have a particularly simple construction when the crashbox components are clamped in between one of the reinforcing elements and one of the walls of the longitudinal supporting beam.

According to another advantageous further development, the intended stability of the crashbox can be simply achieved when the crashbox components or shell parts of the crashbox are joined by a wall element of the crashbox at least outside the longitudinal supporting beam. By virtue of this the crashbox has an enclosed profile in the longitudinal supporting beam outside of the insertion region.

The crashbox can be simply bent upward inside the longitudinal supporting beam and pre-tensioned with the lateral limits against the walls of the longitudinal supporting beam when the wall element joining the crashbox components is slotted inside the longitudinal supporting beam. There is preferably a hole at the end of a slot of the wall element so that to reduce the stresses of the crashbox.

According to another advantageous further development, the crashbox can have a particularly simple construction when the crashbox has two shell parts to accommodate a crashbox component each and when the shell parts are joined with one another exclusively outside the longitudinal supporting beam.

According to another advantageous further development, the construction of an elastic deformability of the wall, joining the crashbox components or the shell parts, can be particularly simply achieved when the wall element of the crashbox, joining the crashbox components or the shell parts has a camber in that state when it is separated from the longitudinal supporting beam.

According to another advantageous further development, contributions to further simplification of the deformability of the crashbox are made during the pre-tensioning against the walls of the longitudinal supporting beam when the wall element of the crashbox joining the crashbox components or the shell elements has deformable stamped-out areas.

According to another advantageous further development, the wall element of the crashbox, joining the crashbox components or the shell parts with one another during pre-tensioning, can simply expand against the wall of the longitudinal supporting beam when the wall element, joining the crashbox components or the shell parts is manufactured from an elastic material.

According to another advantageous further development, the assembly of the crashbox can be particularly simply carried out when the reinforcing elements have at least one inside thread each and when the fastening elements pass through one of the walls of the longitudinal supporting beam and are screwed into one of the inside thread.

According to another advantageous further development, contributions are made to the simplification of the assembly of the crashbox to the longitudinal supporting beam when the crashbox has centering projections which rest on the longitudinal supporting beam.

BRIEF DESCRIPTION OF THE DRAWINGS

The present invention will hereinafter be described in conjunction with the following drawing figures, wherein like numerals denote like elements, FIGS. 4a, 4b are sectioned illustrations through the region of insertion of a further embodiment of the motor vehicle chassis before and after the assembly of a crashbox, FIGS. 5a, 5b are sectioned illustrations through the region of insertion of a further embodiment of the motor vehicle chassis before and after the assembly of a crashbox, FIGS. 6a, 6b are sectioned illustrations through the region of insertion of a further embodiment of the motor vehicle chassis before and after the assembly of a crashbox.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
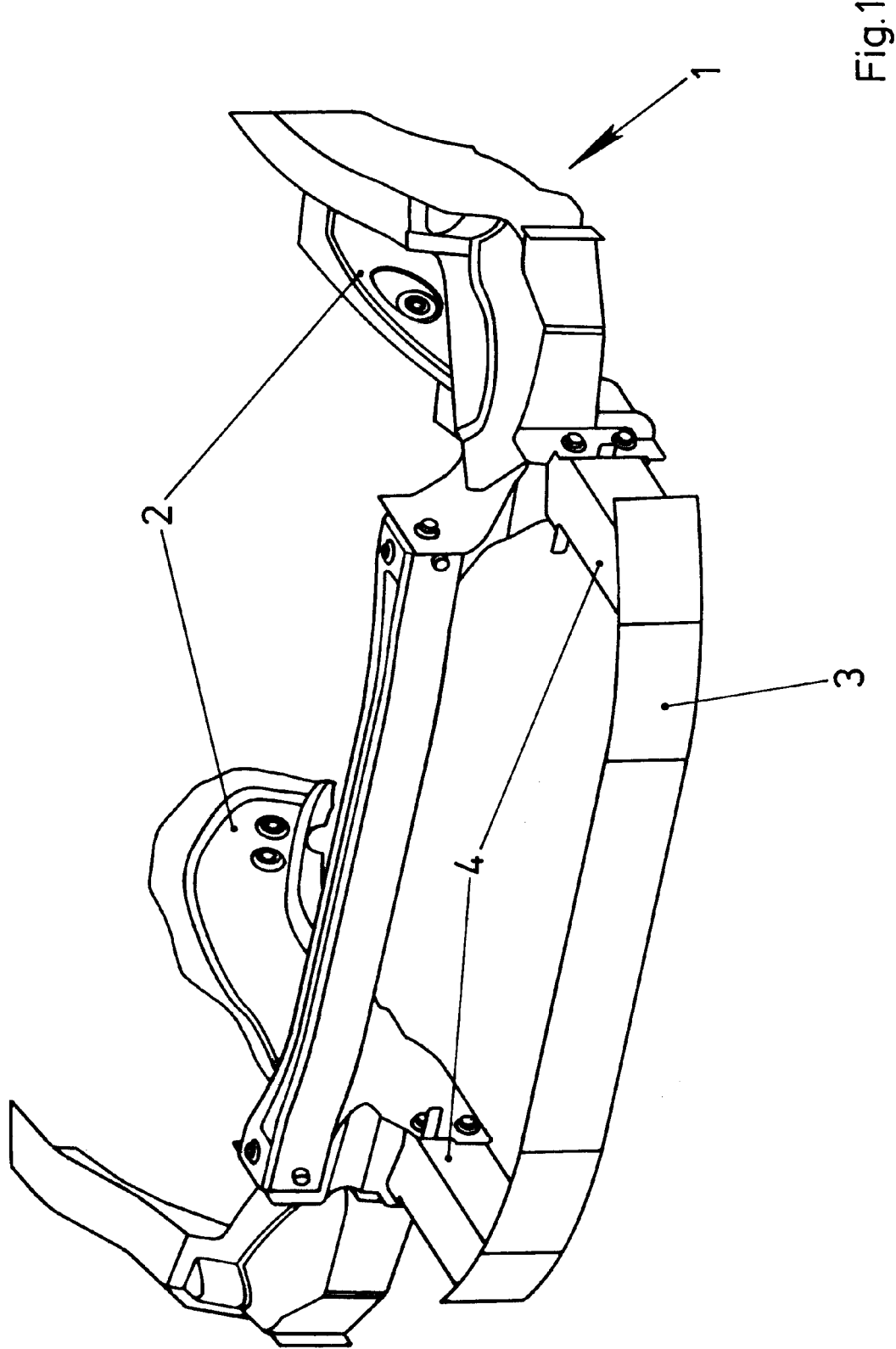
FIG. 1 is a perspective illustration of a portion of the motor vehicle chassis according to an embodiment, facing the direction of travel.
Figure 2:
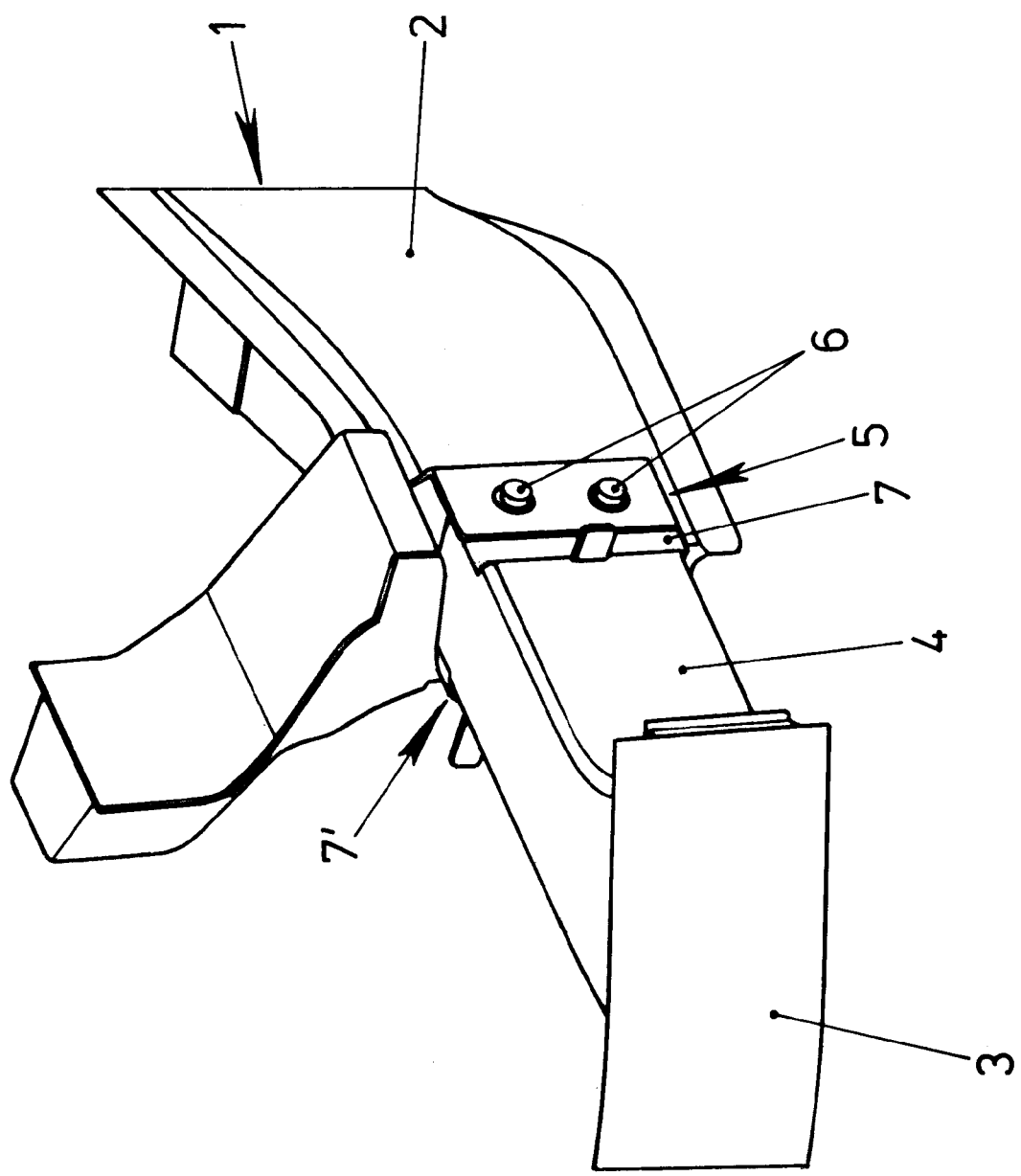
FIG. 2 is a perspective illustration of a lateral portion of the motor vehicle chassis according to an embodiment, from FIG. 1, FIGS. 3a, 3b are sectioned illustrations through a region of insertion of the motor vehicle chassis according to an embodiment, from FIG. 2, before and after the assembly of a crashbox.

FIG. 1 shows a perspective view of a portion of the motor vehicle chassis 1 of a motor vehicle facing the direction of travel, with longitudinal supporting beams 2 and with a transverse bumper bar carrier 3. Between the transverse bumper bar carrier 3 and the longitudinal supporting beams 2 crashboxes 4 are provided. In an alternative embodiment (not illustrated) the longitudinal supporting beams 2 can be provided with crashboxes also in those ends which face the direction opposing the direction of travel. FIG. 2 shows a perspective illustration of one of the crashboxes 4, where the crashbox 4 is inserted into that end of the longitudinal supporting beam 2 which faces the direction of travel. Thus the crashbox 4 has an insertion region 5, with which it is inserted into the longitudinal supporting beam 2. In the insertion region 5 the crashbox 4 is joined with the lateral, opposing walls 7, 7' of the longitudinal supporting beam 2 by means of fastening elements 6, constructed as bolts.

FIG. 3a shows a sectioned illustration through the insertion region 5 of the crashbox 4 in the longitudinal supporting beam 2 during assembly and before the joining with the fastening elements 6. The crashbox 4 has several crashbox components 9, 9' arranged in shell parts 8, 8' and two reinforcing elements 10, 10', and in the position illustrated before the assembly it is narrower than the distance between the opposing walls 7, 7' of the longitudinal supporting beam 2. By virtue of this configuration, the tolerances of the longitudinal supporting beam 2 and of the crashbox 4 are compensated for and a simple insertion of the crashbox 4 into the longitudinal supporting beam 2 is ensured. Furthermore, to simplify the assembly, the crashbox 4 has centering projections 11 which rest on the longitudinal supporting beam 2. The reinforcing elements 10, 10' have several inside threads 12, 12' for the fastening elements 6. For the assembly, the crashbox 6 is inserted into the longitudinal supporting beam 2 until the centering projections 11 reach the longitudinal supporting beam 2. Thus, the crashbox 4 and the longitudinal supporting beam 2 are aligned relative one another and the fastening elements 6 can be screwed into the reinforcing elements 10, 10' through the cut-outs in the longitudinal supporting beam 2. When the fastening elements 6, constructed as bolts, are tightened, the crashbox 4 deforms and with the reinforcing elements 10, 10' it is pulled against the walls 7, 7' of the longitudinal supporting beam 2, as this is illustrated in FIG. 3b. To simplify the deforming, the crashbox 4 has a slot 13 in a wall element 14 joining the crashbox components 9, 9'. After the assembly the crashbox 4 is joined force-locked and form-locked with the longitudinal supporting beam 2.

FIGS. 4a and 4b schematically show a further embodiment of the motor vehicle chassis 1, sectioned in the longitudinal supporting beam 2 through the insertion region 5 of the crashbox 4, during and after the assembly. This embodiment differs from those of FIGS. 3a and 3b first of all by that a wall element 15 of the crashbox 4, connecting the reinforcing elements 10, 10', in that state when it is separated from the longitudinal supporting beam 2, has a camber 16. When the crashbox 4 is bolted to the longitudinal supporting beam 2 a tensile load is introduced into the camber 16 and the wall element 15 is stretched, as this is illustrated in FIG. 4b.

FIGS. 5a and 5b show also schematically a further embodiment of the motor vehicle chassis 1, sectioned in the longitudinal supporting beam 2 through the insertion region 5 of the crashbox 4, during and after the assembly. This differs from that of FIGS. 4a and 4b by that a wall element 17, connecting the reinforcing elements 10, 10' of the crashbox 4, has stamped out areas 18. During assembly a tensile load is introduced into the wall element 17 also in this case. The stamped-out areas 18 are turned upward, as this is illustrated in FIG. 5b, and enable a movement and pre-tensioning of the regions of the crashbox 4 positioned against the walls 7, 7' of the longitudinal supporting beam 2 against the walls 7, 7'.

FIGS. 6a and 6b show also schematically a further embodiment of the motor vehicle chassis 1, sectioned in the longitudinal supporting beam 2 through the insertion region 5 of the crashbox 4 during and after the assembly. In this case the shell parts 8, 8' of the crashbox 4 in that state when it is separated from the longitudinal supporting beam 2 form an overlapping wall element 19. During assembly the shell parts 8, 8' are pre-tensioned by the fastening elements 6, constructed as bolts, against the walls 7, 7' of the longitudinal supporting beam 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle chassis for a motor vehicle with a longitudinal support beam and with a crashbox that is inserted into one end of the longitudinal supporting beam facing the direction of the travel or opposing it and is fastened between two opposite situated walls of the longitudinal supporting beam, wherein the crashbox, when it is separated from the longitudinal supporting beam, is narrower than the distance between the two walls of the longitudinal supporting beam, wherein the end of the crashbox which protrudes into the longitudinal supporting beam can be deformed in the direction of the walls of the longitudinal supporting beam, and wherein the crashbox is laterally pre-tensioned against the walls of the longitudinal supporting beam; wherein
the crashbox has centering projections which rest on the longitudinal supporting beam.

2. A motor vehicle chassis according to claim 1, wherein the crashbox has at least two crashbox components which can move relative one another and that one of the crashbox components is fastened on one wall and the other crashbox component on the opposite situated wall of the longitudinal supporting beam.

3. A motor vehicle chassis according to claim 1, wherein the crashbox has at least two reinforcing elements and that fastening elements join a reinforcing element each with the adjacent wall of the longitudinal supporting beam.

4. A motor vehicle chassis according to claim 3, wherein the crashbox has at least two crashbox components, each being allocated to one reinforcing element.

5. A motor vehicle chassis according to claim 2, wherein the crashbox has at least two reinforcing elements, and wherein the crashbox components are pre-fixed with one of the reinforcing elements.

6. A motor vehicle chassis according to claim 2, wherein the crashbox comprises at least two shell parts, and wherein at least one of the crashbox components and the shell parts of the crashbox are joined by a wall element of the crashbox at least outside the longitudinal supporting beam.

7. A motor vehicle chassis according to claim 6, wherein the wall element joining the crashbox components is slotted inside the longitudinal supporting beam.

8. A motor vehicle chassis according to claim 6, wherein the crashbox has two shell parts to accommodate a crashbox component each and that the shell parts are joined with one another exclusively outside the longitudinal supporting beam.

9. A motor vehicle chassis according to claim 6, wherein the wall element, joining the crashbox components or the shell parts, is manufactured from an elastic material.

10. A motor vehicle chassis according to claim 3, wherein the reinforcing elements have at least one inside thread each and that the fastening elements pass through one of the walls of the longitudinal supporting beam and are screwed into one of the inside thread.

11. A motor vehicle chassis for a motor vehicle with a longitudinal support beam and with a crashbox that is inserted into one end of the longitudinal supporting beam facing the direction of the travel or opposing it and is fastened between two opposite situated walls of the longitudinal supporting beam, wherein the crashbox, when it is separated from the longitudinal supporting beam, is narrower than the distance between the two walls of the longitudinal supporting beam, wherein the end of the crashbox which protrudes into the longitudinal supporting beam can be deformed in the direction of the walls of the longitudinal supporting beam, and wherein the crashbox is laterally pre-tensioned against the walls of the longitudinal supporting beam; wherein
the crashbox has at least two crashbox components which can move relative one another;
the crashbox has at least two reinforcing elements;
one of the crashbox components is fastened on one wall and the other crashbox component is fastened on the opposite situated wall of the longitudinal supporting beam; and
the crashbox components are clamped between one of the reinforcing elements and one of the walls of the longitudinal supporting beam.

12. A motor vehicle chassis for a motor vehicle with a longitudinal support beam and with a crashbox that is inserted into one end of the longitudinal supporting beam facing the direction of the travel or opposing it and is fastened between two opposite situated walls of the longitudinal supporting beam, wherein the crashbox, when it is separated from the longitudinal supporting beam, is narrower than the distance between the two walls of the longitudinal supporting beam, wherein the end of the crashbox which protrudes into the longitudinal supporting beam can be deformed in the direction of the walls of the longitudinal supporting beam, and wherein the crashbox is laterally pre-tensioned against the walls of the longitudinal supporting beam; wherein
the crashbox has at least two crashbox components which can move relative one another;
one of the crashbox components is fastened on one wall and the other crashbox component is fastened on the opposite situated wall of the longitudinal supporting beam;
the crashbox comprises at least two shell parts;
at least one of the crashbox components and the shell parts of the crashbox are joined by a wall element of the crashbox at least outside the longitudinal supporting beam; and
the wall element of the crashbox has a camber in that state when it is separated from the longitudinal supporting beam.

13. A motor vehicle chassis for a motor vehicle with a longitudinal support beam and with a crashbox that is inserted into one end of the longitudinal supporting beam facing the direction of the travel or opposing it and is fastened between two opposite situated walls of the longitudinal supporting beam, wherein the crashbox, when it is separated from the longitudinal supporting beam, is narrower than the distance between the two walls of the longitudinal supporting beam, wherein the end of the crashbox which protrudes into the longitudinal supporting beam can be deformed in the direction of the walls of the longitudinal supporting beam, and wherein the crashbox is laterally pre-tensioned against the walls of the longitudinal supporting beam; wherein the crashbox has at least two crashbox components which can move relative one another;

one of the crashbox components is fastened on one wall and the other crashbox component is fastened on the opposite situated wall of the longitudinal supporting beam;

the crashbox comprises at least two shell parts;

at least one of the crashbox components and the shell parts of the crashbox are joined by a wall element of the crashbox at least outside the longitudinal supporting beam; and the wall element of the crashbox has deformable stamped-out areas.

* * * * *